US008767860B2

(12) United States Patent
Catreux et al.

(10) Patent No.: US 8,767,860 B2
(45) Date of Patent: *Jul. 1, 2014

(54) FREQUENCY SELECTIVE TRANSMIT SIGNAL WEIGHTING FOR MULTIPLE ANTENNA COMMUNICATION SYSTEMS

(75) Inventors: Severine Catreux, Cardiff, CA (US); Vinko Erceg, Cardiff, CA (US); Pieter Roux, San Diego, CA (US); Pieter van Rooyen, San Diego, CA (US); Jack Winters, Middletown, NJ (US)

(73) Assignee: Broadcom Corporation, Irvine, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/004,160

(22) Filed: Jan. 11, 2011

(65) Prior Publication Data
US 2012/0076238 A1 Mar. 29, 2012

Related U.S. Application Data

(63) Continuation of application No. 12/468,722, filed on May 19, 2009, now Pat. No. 7,869,537, which is a continuation of application No. 10/903,876, filed on Jul. 29, 2004, now Pat. No. 7,535,969.

(60) Provisional application No. 60/491,128, filed on Jul. 29, 2003.

(51) Int. Cl.
*H04B 7/02* (2006.01)
*H04L 1/02* (2006.01)

(52) U.S. Cl.
USPC ........... 375/267; 375/260; 375/299; 375/347; 375/349; 455/506; 455/65; 455/101; 455/137

(58) Field of Classification Search
CPC .............. H04L 27/2647; H04L 5/0007; H04L 27/2657; H04L 27/2662; H04L 5/0048; H04L 1/0618; H04L 1/06; H04L 25/0204; H04L 1/0071; H04B 7/0854; H04B 7/0857; H04B 1/123; H04B 7/002; H04B 1/109; H04B 7/0845; H04B 7/0417; H04B 7/0669; H04B 1/588; H04B 1/7117; H04B 1/7113; H04B 1/1027; H04B 1/1081; H04B 1/7115; H04B 1/711; H04B 17/009; H04B 7/0617; H04B 7/0634; H04B 7/0671; H04B 7/084; H04B 7/0837; H04B 7/0865; H04B 7/10
USPC .......... 375/267, 260, 299, 347, 349; 455/506, 455/65, 101, 137; 370/308
See application file for complete search history.

(56) References Cited

U.S. PATENT DOCUMENTS 6,144,711 A 11/2000 Raleigh et al.
6,369,758 B1 4/2002 Zhang
(Continued)

FOREIGN PATENT DOCUMENTS

EP 1 180 856 A2 2/2002

OTHER PUBLICATIONS

Catreux, S. et al., "Adaptive Modulation and MIMO Coding for Broadband Wireless Data Networks," *IEEE Communications Magazine*, vol. 40, No. 6, Jun. 2002, pp. 108-115.

(Continued)

*Primary Examiner* — Phuong Phu
(74) *Attorney, Agent, or Firm* — Sterne, Kessler, Goldstein & Fox P.L.L.C.

(57) ABSTRACT

A method for communication includes performing by one or more processors and/or circuits in a communication device functions including determining transmit power weights, which are to be utilized for communicating one or more wireless signals via a wireless channel, as a function of frequency of a wireless signal communicated via the wireless channel. The determining may be based on a transmission mode of the wireless signal and a state of the wireless communication channel. Transmit antenna spatial weights may be determined for communicating the one or more wireless signals via a plurality of antennas. The one or more wireless signals may be weighted with the transmit power weights and/or one of the transmit antenna spatial weights. The weighted one or more wireless signals may be transmitted via one of a plurality of antennas in accordance with the transmission mode.

24 Claims, 10 Drawing Sheets

(56) References Cited

U.S. PATENT DOCUMENTS

| | | | |
|---|---|---|---|
| 6,771,706 | B2 | 8/2004 | Ling et al. |
| 7,020,110 | B2 | 3/2006 | Walton et al. |
| 7,072,413 | B2 | 7/2006 | Walton et al. |
| 7,177,369 | B2 | 2/2007 | Crilly, Jr. |
| 7,535,969 | B2 * | 5/2009 | Catreux et al. ............ 375/267 |
| 7,869,537 | B2 * | 1/2011 | Catreux et al. ............ 375/267 |
| 2002/0012380 | A1 | 1/2002 | Hottinen et al. |
| 2002/0034263 | A1 | 3/2002 | Schmidl et al. |
| 2002/0147953 | A1 | 10/2002 | Catreux et al. |
| 2003/0048856 | A1 | 3/2003 | Ketchum et al. |
| 2003/0123382 | A1 | 7/2003 | Wang et al. |
| 2004/0192218 | A1 | 9/2004 | Oprea |

OTHER PUBLICATIONS

Chuah, C.-N. et al., "Capacity of Multi-Antenna Array Systems in Indoor Wireless Environment," *Proceedings of GLOBECOM '98 Sydney, Australia, IEEE*, Nov. 1998, pp. 1894-1899.

Foschini, G.J. and Gans, M.J., "On Limits of Wireless Communications in a Fading Environment When Using Multiple Antennas," *Wireless Personal Communications*, Kluwer Academic Publishers, vol. 6, No. 3, Mar. 1998, pp. 311-335.

Foschini, G.J. et al., "Simplified Processing for High Spectral Efficiency Wireless Communication Employing Multi-Element Arrays", *IEEE Journal on Selected Areas in Communications*, vol. 17, Issue 11, Nov. 1999, pp. 1841-1852.

Furuskär, A. et al., "System Performance of EDGE, a Proposal for Enhanced Data Rates in Existing Digital Cellular Systems", *48th IEEE Vehicular Technology Conference*, vol. 2, May 1998, pp. 1284-1289.

Schramm, P. et al., "Radio Interface Performance of EDGE, a Proposal for Enhanced Data Rates in Existing Digital Cellular Systems", *48th IEEE Vehicular Technology Conference*, vol. 2, May 1998, pp. 1064-1068.

Shiu, D. et al., "Fading Correlation and Its Effect on the Capacity of Multi-Element Antenna Systems," *IEEE Transactions on Communications*, vol. 48, No. 3, Mar. 2000, pp. 502-513.

Tomlinson, M., "New Automatic Equaliser Employing Modulo Arithmetic", *Electronics Letters*, vol. 7, Nos. 5/6, Mar. 25, 1971, pp. 138-139.

van de Beek, J. et al., "On Channel Estimation in OFDM Systems," *Proceedings of Vehicular Technology Conference (VTC '95)*, vol. 2, Sep. 1995, pp. 815-819.

Wang, J. and Yao, K., "Multiuser Spatio-Temporal Coding for Wireless Communications", *Wireless Communications and Networking Conference*, 2002, pp. 276-279.

Winters, J.H., "Optimum Combining for Indoor Radio Systems with Multiple Users," *IEEE Transactions on Communications*, vol. COM-35, No. 11, Nov. 1987, pp. 1222-1230.

Winters, J.H., et al., "The Impact of Antenna Diversity on the Capacity of Wireless Communications Systems," *IEEE Transactions on Communications*, vol. 10, No. 2/3/4, Feb. 1994, pp. 1740-1751.

Wolniansky, P.W. et al., "V-BLAST: An Architecture for Realizing Very High Data Rates Over the Rich-Scattering Wireless Channel," *Proceedings of URSI International Symposium on Signals, Systems, and Electronics*, Sep. 1998, pp. 295-300.

International Search Report, for PCT Appl. No. PCT/US04/24656, dated May 19, 2006, 2 pages.

Written Opinion of the International Searching Authority, for PCT Appl. No. PCT/US04/24656, dated May 19, 2006, 6 pages.

Supplemental European Search Report, for EP Appl. No. 04817740.6, dated Oct. 10, 2011, 3 pages.

Communication pursuant to Article 94(3) EPC, for EP Appl. No. 04817740.6, dated Apr. 4, 2012, 5 pages.

Extended European Search Report, for EP Appl. No. 12005497.8, dated Dec. 17, 2012, 8 pages.

Extended European Search Report, for EP Appl. No. 12005498.6, dated Dec. 17, 2012, 8 pages.

* cited by examiner

FREQUENCY SELECTIVE TRANSMIT SIGNAL WEIGHTING FOR MULTIPLE ANTENNA COMMUNICATION SYSTEMS

CROSS-REFERENCE TO RELATED APPLICATIONS

This application is a continuation of U.S. patent application Ser. No. 12/468,722 (now U.S. Pat. No. 7,869,537) filed May 19, 2009, which is a continuation of U.S. patent application Ser. No. 10/903,876 (now U.S. Pat. No. 7,535,969) filed Jul. 29, 2004, which claims priority under 35 U.S.C. §119(e) to U.S. provisional application Ser. No. 60/491,128, entitled FREQUENCY SELECTIVE TRANSMIT SIGNAL WEIGHTING FOR MULTIPLE ANTENNA SYSTEMS, filed Jul. 29, 2003, which is herein incorporated by reference in its entirety. This application is also related to U.S. non-provisional application Ser. No. 10/801,930 (now U.S. Pat. No. 7,822,140), entitled MULTI-ANTENNA COMMUNICATION SYSTEMS UTILIZING RF-BASED AND BASEBAND SIGNAL WEIGHTING AND COMBINING, filed Mar. 16, 2004, to U.S. non-provisional application Ser. No. 10/835,255 (now U.S. Pat. No. 7,539,274), entitled WEIGHT GENERATION METHOD FOR RF SIGNAL COMBINING IN MULTI-ANTENNA COMMUNICATION SYSTEMS, filed Apr. 29, 2004, and to copending U.S. non-provisional application Ser. No. 10/886,510, entitled SYSTEM AND METHOD FOR RF SIGNAL COMBINING AND ADAPTIVE BIT LOADING FOR DATA RATE MAXIMIZATION IN MULTI-ANTENNA COMMUNICATION SYSTEMS, filed Jul. 7, 2004, which itself claims priority to U.S. provisional Ser. No. 60/485,915 filed Jul. 9, 2003, all of which are incorporated by reference and assigned to the assignee of the present application.

FIELD OF THE INVENTION

The present invention relates to communication systems utilizing transmitters and receivers having multiple antenna elements. More particularly, the present invention relates to a weight generation method for facilitating signal weighting and combining, within multi-antenna systems.

BACKGROUND OF THE INVENTION

Most current wireless communication systems are composed of nodes configured with a single transmit and receive antenna. However, for a wide range of wireless communication systems, it has been predicted that the performance, including capacity, may be substantially improved through the use of multiple transmit and/or multiple receive antennas. Such configurations form the basis of many so-called "smart" antenna techniques. Such techniques, coupled with space-time signal processing, can be utilized both to combat the deleterious effects of multipath fading of a desired incoming signal and to suppress interfering signals. In this way both the performance and capacity of digital wireless systems in existence or being deployed (e.g., CDMA-based systems, TDMA-based systems, WLAN systems, and OFDM-based systems such as IEEE 802.11a/g) may be improved.

The impairments to the performance of wireless systems of the type described above may be at least partially ameliorated by using multi-element antenna systems designed to introduce a diversity gain and suppress interference within the signal reception process. This has been described, for example, in "The Impact of Antenna Diversity On the Capacity of Wireless Communication Systems", by J. H. Winters et al, IEEE Transactions on Communications, vol. 42, No. 2/3/4, pages 1740-1751, February 1994. Such diversity gains improve system performance by mitigating multipath for more uniform coverage, increasing received signal-to-noise ratio (SNR) for greater range or reduced required transmit power, and providing more robustness against interference or permitting greater frequency reuse for higher capacity.

Within communication systems incorporating multi-antenna receivers, it is known that a set of M receive antennas are capable of nulling up to M-1 interferers. Accordingly, N signals may be simultaneously transmitted in the same bandwidth using N transmit antennas, with the transmitted signal then being separated into N respective signals by way of a set of N antennas deployed at the receiver. Systems of this type are generally referred to as multiple-input-multiple-output (MIMO) systems, and have been studied extensively. See, for example, "Optimum combining for indoor radio systems with multiple users," by J. H. Winters, IEEE Transactions on Communications, Vol. COM-35, No. 11, November 1987; "Capacity of Multi-Antenna Array Systems In Indoor Wireless Environment" by C. Chuah et al, Proceedings of Globecom '98 Sydney, Australia, IEEE 1998, pages 1894-1899 November 1998; and "Fading Correlation and Its Effect on the Capacity of Multi-Element Antenna Systems" by D. Shiu et al, IEEE Transactions on Communications vol. 48, No. 3, pages 502-513 March 2000.

One aspect of the attractiveness of multi-element antenna arrangements, particularly MIMOs, resides in the significant system capacity enhancements that can be achieved using these configurations. Under the assumption of perfect estimates of the applicable channel at the receiver, in a MIMO system with N transmit and N receive antenna elements, the received signal decomposes to N "spatially-multiplexed" independent channels. This results in an N-fold capacity increase relative to single-antenna systems. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., "On Limits of Wireless Communications in a Fading Environment When Using Multiple Antennas", by G. J. Foschini et al, Wireless Personal Communications, Kluwer Academic Publishers, vol. 6, No. 3, pages 311-335, March 1998. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., "Simplified processing for high spectral efficiency wireless communication employing multi-element arrays", by G. J. Foschini, et al, IEEE Journal on Selected Areas in Communications, Volume: 17 Issue: 11, November 1999, pages 1841-1852.

Although increasing the number of transmit and/or receive antennas enhances various aspects of the performance of MIMO systems, the necessity of providing a separate RF chain for each transmit and receive antenna increases costs. Each RF chain is generally comprised of a low noise amplifier, filter, downconverter, and analog to digital to converter (A/D), with the latter three devices typically being responsible for most of the cost of the RF chain. In certain existing single-antenna wireless receivers, the single required RF chain may account for in excess of 30% of the receiver's total cost. It is thus apparent that as the number of transmit and receive antennas increases, overall system cost and power consumption may dramatically increase. It would therefore be desirable to provide a technique for utilizing relatively larger numbers of transmit/receive antennas without proportionately increasing system costs and power consumption.

The above-referenced copending non-provisional application Ser. No. 10/801,930 provides such a technique by describing a wireless communication system in which it is possible to use a smaller number of RF chains within a transmitter and/or receiver than the number of transmit/receiver antennas utilized.

In the case of an exemplary receiver implementation, the signal provided by each of M (M>N) antennas is passed through a low noise amplifier and then split, weighted and combined in the RF domain with the signals from the other antennas of the receiver. This forms NRF output signals, which are then passed through NRF chains. The output signals produced by an A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only NRF chains, can be realized at a cost similar to that of a system having N receive antennas. That is, receiver performance may be improved through use of additional antennas at relatively low cost. A similar technique can be used within exemplary transmitter implementations incorporating NRF chains and more than N transmit antennas.

The RF-based weighting techniques described in the above-referenced copending non-provisional application Ser. No. 10/801,930 advantageously enable the same type of combining of spatially weighted signals to be performed in the RF domain as is done at baseband. One advantage of these techniques is that RF weighting and combining may be performed using only N transmit and N receive RF chains, independent of the number of transmit and receive antennas. Furthermore, notwithstanding the fact that the '930 application describes RF-based weighting and combining, it remains possible to implement the digital signal processing schemes prior to conversion to analog/RF within the transmitter and subsequent to conversion to digital from analog/RF within the receiver. Such techniques may include successive interference cancellation in the case of MIMO systems (see, e.g., "V-BLAST: An architecture for realizing very high data rates over the rich-scattering wireless channel," in Proceedings of URSI ISSSE, September, 1998, pp. 295-300).

Although the techniques described in the above-referenced copending non-provisional application Ser. No. 10/801,930 may not offer performance identical to baseband techniques in the case of temporal and/or frequency domain signal processing, it may still be preferable to employ such techniques as a result of the lower costs involved. Frequency domain processing is used in systems in which, for example, the transmitted signal consists of a number of frequency subcarriers. This type of signal processing is required to be performed when implementing systems based upon orthogonal frequency division multiplexing (OFDM), such as the wireless local area network systems popularly referred to simply as "802.11(a)" and "802.11(g)". Alternatively, for the same or lower cost as is required by conventional approaches, the techniques of the above-referenced copending non-provisional application Ser. No. 10/801,930 may be employed to enable the use of a greater number of antennas, which may result in substantially superior performance relative to such conventional approaches.

SUMMARY OF THE INVENTION

The present invention is directed to a system and method for generating transmit signal weight values with frequency for weighting elements included within the signal weighting and combining arrangements used in various multi-antenna transmitter and receiver structures. Specifically, the present invention may be used in conjunction with RF-based weighting and combining arrangements within multi-antenna transmitter and receiver structures disposed to process one or more information signals modulated upon respective pluralities of subcarrier signals. The present invention may also find application when baseband weighting and combining arrangements are incorporated within the same multi-antenna transmitter or receiver structure, or furthermore when both RF-based and baseband weighting and combining arrangements are used.

Consistent with the invention, the frequency-selective weight generation method varies with the transmission mode. The inventive weight generation method may be employed within several different types of multi-antenna communication systems including, for example, those described within the above-referenced copending non-provisional applications. In particular embodiments the inventive technique may be applied to a multi-antenna receiver within a "single channel" (SC) system (i.e., a system lacking spatial multiplexing), to a multi-antenna transmitter in a single channel system, or to a MIMO system employing spatial multiplexing.

As is described herein, the frequency-selective transmit signal weight values can be generated based on the transmit and receive spatial weights to optimize a performance measure such as the output signal-to-noise ratio, the output bit error rate, or the output packet error rate of the multi-antenna communication system. The frequency-selective transmit signal weight values can also be generated jointly with transmit and receive spatial weights to optimize performance.

In one aspect, the present invention relates to a method, and means to implement the method, for transmitting a signal over a wireless channel. The method including the steps of: acquiring information representative of a state of the channel based upon an initial signal transmitted over the channel; acquiring information representative of a transmission mode of the signal; determining transmit weighting values for the signal as a function of frequency based upon the state of the channel and the transmission mode of the signal; weighting the signal with the transmit weighting values thereby generating a weighted signal; and transmitting the weighted signal in accordance with the transmission mode.

The invention is also directed to a system for transmitting a signal. The system includes a receiver configured to receive an initial signal and estimate a channel state information for the initial signal; and a transmitter configured to transmit the signal according to a transmission mode and to perform transmit signal weighting as a function of frequency based on the channel state information and the transmission mode.

In another aspect, the invention pertains to a system that includes a receiver configured to receive an initial signal and estimate a combination of transmit signal weighting values as a function of frequency based on a pre-determined channel state information and transmission mode. The system also includes a transmitter configured to weight the signal with the said transmit weighting values thereby generating a weighted signal and transmit the weighted signal in accordance with the transmission mode.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

Figure 1A:
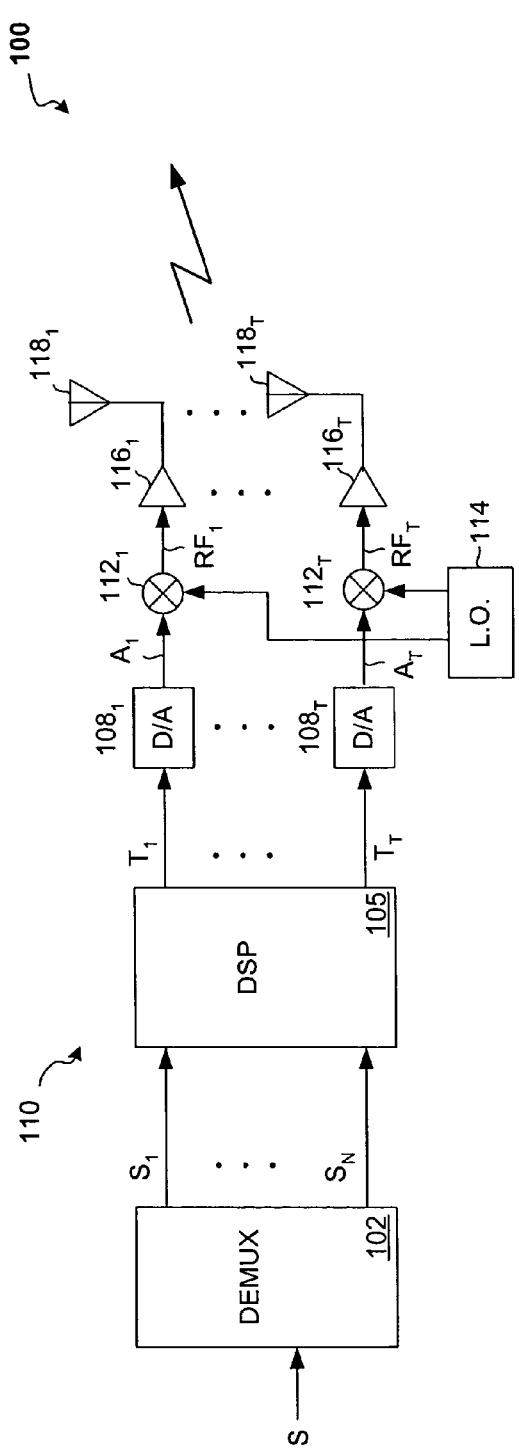
FIG. 1 is a block diagram illustratively representing a conventional MIMO communication system.

As is discussed below, the present invention according to several embodiments is directed to a method of frequency selective, transmit-signal weight-values generation that is applicable to a variety of communication systems that employ a variety of coding and modulation techniques. In accordance with the invention, the weight values can be generated to improve one or more of the communication system's performance characteristics including output signal-to-noise ratio and packet error rate. Advantageously, in some embodiments the frequency selective transmit signal weighting techniques described herein are employed in connection with other performance enhancing techniques including, but not limited to, spatial weighting, which is used to improve performance in multi-antenna systems as described in the above-referenced copending non-provisional application Ser. No. 10/801,930, incorporated herein by reference.

In order to facilitate appreciation of the principles of the invention, an overview is provided that generally covers various performance-enhancing schemes utilized in connection with the frequency selective transmit signal weighting method in accordance with several embodiments of the present invention. This overview is followed by a detailed description of the inventive method of transmit signal weight generation, which may be applied, without limitation, within the context of these and other performance enhancing schemes as disclosed herein.

I. Performance Enhancing Methodologies

Spatial Multiplexing

As is known, spatial multiplexing (SM) provides a mode of signal transmission predicated upon the use of multiple antennas at both a transmitter and a receiver in such a way that the bit rate of a wireless radio link may be increased without correspondingly increasing power or bandwidth consumption. In the case in which N antennas are used at both a transmitter and a receiver, an input stream of information symbols provided to the transmitter is divided into N independent substreams. Spatial multiplexing contemplates that each of these substreams will occupy the same "channel" (e.g., time slot, frequency, or code/key sequence) of the applicable multiple-access protocol. Within the transmitter, each substream is separately applied to the N transmit antennas and propagated over an intervening multipath communication channel to a receiver. The composite multipath signals are then received by a receive array of N receive antennas deployed at the receiver. At the receiver, a "spatial signature" defined by the N phases and N amplitudes arising at the receive antenna array for a given substream is then estimated. Signal processing techniques are then applied in order to separate the received signals, which permits the original substreams to be recovered and synthesized into the original input symbol stream. The principles of spatially-multiplexed communication and exemplary system implementations are further described in, for example, "Optimum combining for indoor radio systems with multiple users", by J. H. Winters, IEEE Transactions on Communications, Vol. COM-35, No. 11, November 1987, which is incorporated herein by reference in its entirety.

Conventional MIMO System

Figure 1B:
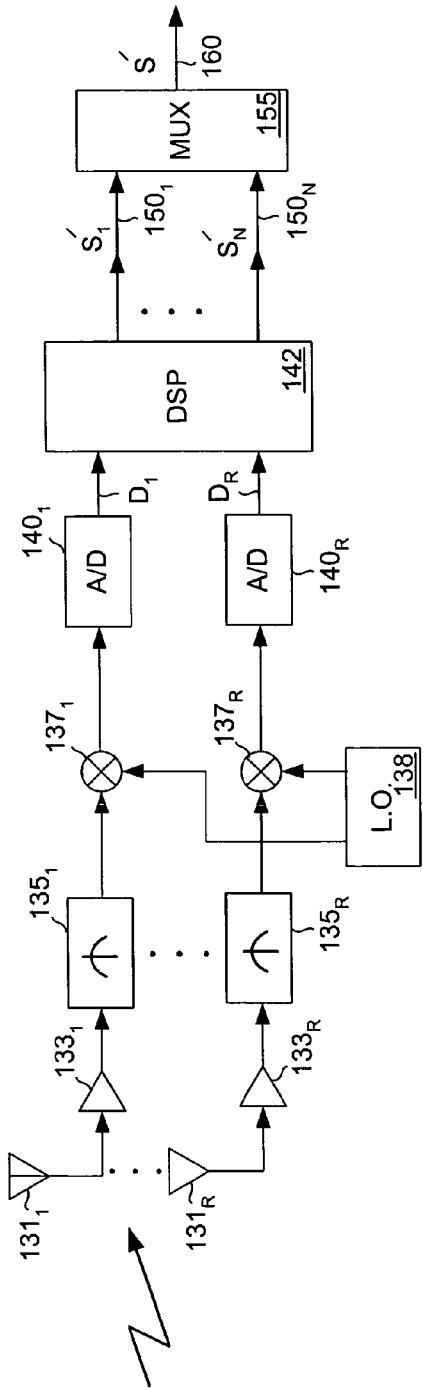

The principles of the present invention may be more fully elucidated by first considering a conventional MIMO communication system, which is illustratively represented by FIG. 1. As shown, the MIMO system 100 of FIG. 1 includes a transmitter 110 depicted in FIG. 1A and a receiver 130 depicted in FIG. 1B. The transmitter 110 and receiver 130 include a set of T transmit RF chains and a set of R receive RF chains, respectively, which are configured to transmit and receive a group of N spatially-multiplexed signals. Within the system 100 it is assumed that either (i) T is greater than N and R is equal to N, (ii) T is equal to N and R is greater than N, or (iii) both T and R are greater than N.

Referring to FIG. 1A, an input signal S to be transmitted, which typically consists of a stream of digital symbols, is demultiplexed by demultiplexer 102 into N independent substreams $S_{1, 2, \ldots, N}$. The substreams $S_{1, 2, \ldots, N}$ are then sent to digital signal processor (DSP) 105, which generates a set of T output signals $T_{1, 2, \ldots, T}$. The T output signals $T_{1, 2, \ldots, T}$ are typically generated from the N substreams $S_{1, 2, \ldots, N}$ by weighting, i.e., multiplying by a complex number, each of the N substreams $S_{1, 2, \ldots, N}$ by T different weighting coefficients to form NT substreams. These N·T substreams are then combined in order to form the T output signals $T_{1, 2, \ldots, T}$. The T output signals $T_{1, 2, \ldots, T}$ are then converted to T analog signals $A_{1, 2, \ldots, T}$ using a set of T digital-to-analog (D/A) converters 108. Each of the T analog signals $A_{1, 2, \ldots, T}$ is then upconverted to the applicable transmit carrier RF frequency within a mixer 112 by mixing with a signal provided by a local oscillator 114. The resulting set of T RF signals (i.e., $RF_{1, 2, \ldots, T}$) are then amplified by respective amplifiers 116 and transmitted by respective antennas 118.

Referring now to FIG. 1B, the RF signals transmitted by the transmitter 110 are received by a set of R receive antennas 131 deployed at the receiver 130. Each of the R signals received by an antenna 131 is amplified by a respective low noise amplifier 133 and passed through a filter 135. The resultant filtered signals are then each downconverted from RF to baseband using mixers 137, each of which is provided with a signal from local oscillator 138. Although the receiver of FIG. 1B is configured as a homodyne receiver, a heterodyne receiver characterized by an intermediate IF frequency could also be used. The respective R baseband signals produced by the mixers 137 are then converted to digital signals using a corresponding set of R analog-to-digital (A/D) converters 140. The resulting R digital signals $D_{1, 2 \ldots, R}$ are then weighted and combined using digital signal processor 142 to form N spatially-multiplexed output signals $S'_{1, 2 \ldots, N}$, which comprise estimates of the transmitted signals $S_{1, 2 \ldots, N}$. The N output signals $S'_{1, 2 \ldots, N}$ are then multiplexed using a multiplexer 155 in order to generate an estimate 160 (S') of the original input signal S.

RF Weighting and Combining in Spatially-Multiplexed Communication Systems

Turning now to FIG. 2, there is shown a block diagram of a MIMO communication system 200 having a transmitter 210 and receiver 250 configured in accordance with the principles of the above-referenced non-provisional patent applications. In the implementation of FIG. 2, the transmitter 210 and receiver 250 effect N-fold spatial multiplexing using only N transmit/receive RF chains, even though more than N transmit/receive antennas are respectively deployed at the transmitter 210 and receiver 250. Specifically, the transmitter 210 includes a set of MT transmit antennas 240 and the receiver includes a set of MR receive antennas 260, it being assumed that either (i) MT is greater than N and MR is equal to N, (ii) MT is equal to N and MR is greater than N, or (iii) both MT and MR are greater than N.

Figure 2A:
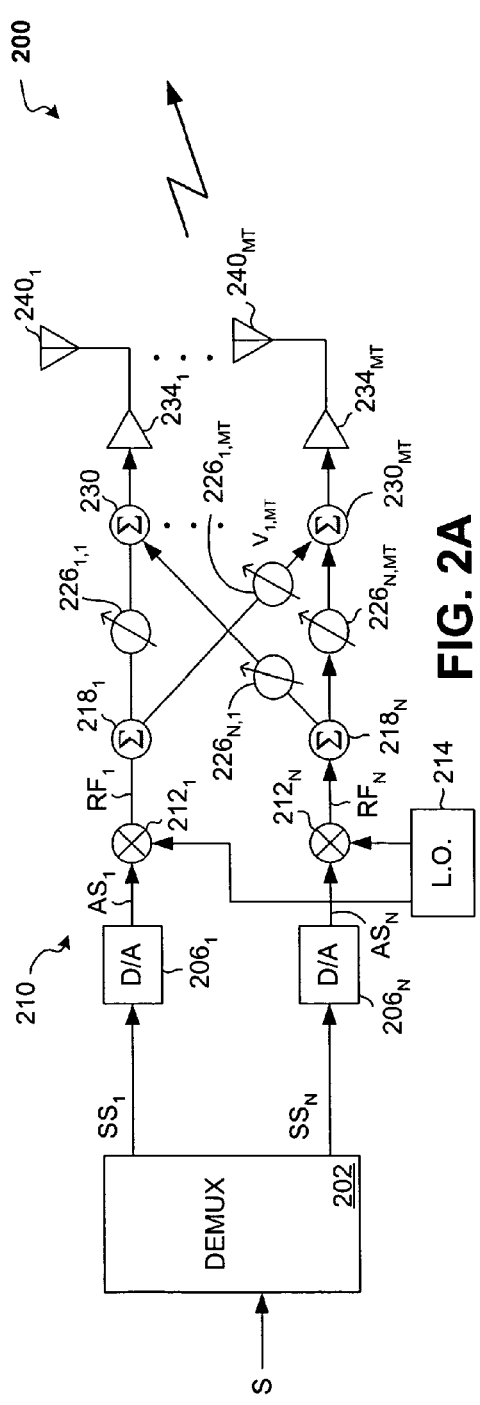
FIG. 2 shows a block diagram of a MIMO communication system having a transmitter and a receiver configured to effect RF-based weighting and combining.

As shown in FIG. 2A, an input signal S to be transmitted is demultiplexed by demultiplexer 202 into N independent substreams $SS_{1, 2 \ldots, N}$. The substreams $SS_{1, 2 \ldots, N}$ are then converted to N analog substreams $AS_{1, 2 \ldots, N}$ using a corresponding set of D/A converters 206. Next, the N analog substreams $AS_{1, 2 \ldots, N}$ are upconverted to the applicable transmit carrier RF frequency using a set of mixers 212 provided with the signal produced by a local oscillator 214. The resultant N RF signals (i.e., $RF_{1, 2 \ldots, N}$) are then each split MT ways by dividers 218 in order to form N·(MT) RF signals. These N·(MT) RF signals are each weighted using complex multipliers $226_{x,y}$, where x identifies a signal origination point at one of the N dividers 218 and y identifies a corresponding signal termination point at one of a set of MT combiners 230. The weighted RF signals are combined using the combiners 230, thereby yielding a set of MT output signals. A corresponding set of MT amplifiers 234 then amplify these MT output signals, with the amplified output signals then being transmitted using the MT antennas 240. The weighting values of the complex multipliers $226_{x,y}$ may be generated so as to maximize the SNR or to minimize the BER of the output signal at the receiver as described in the above-referenced U.S. non-provisional application Ser. No. 10/801,930, which is incorporated by reference.

Figure 2B:
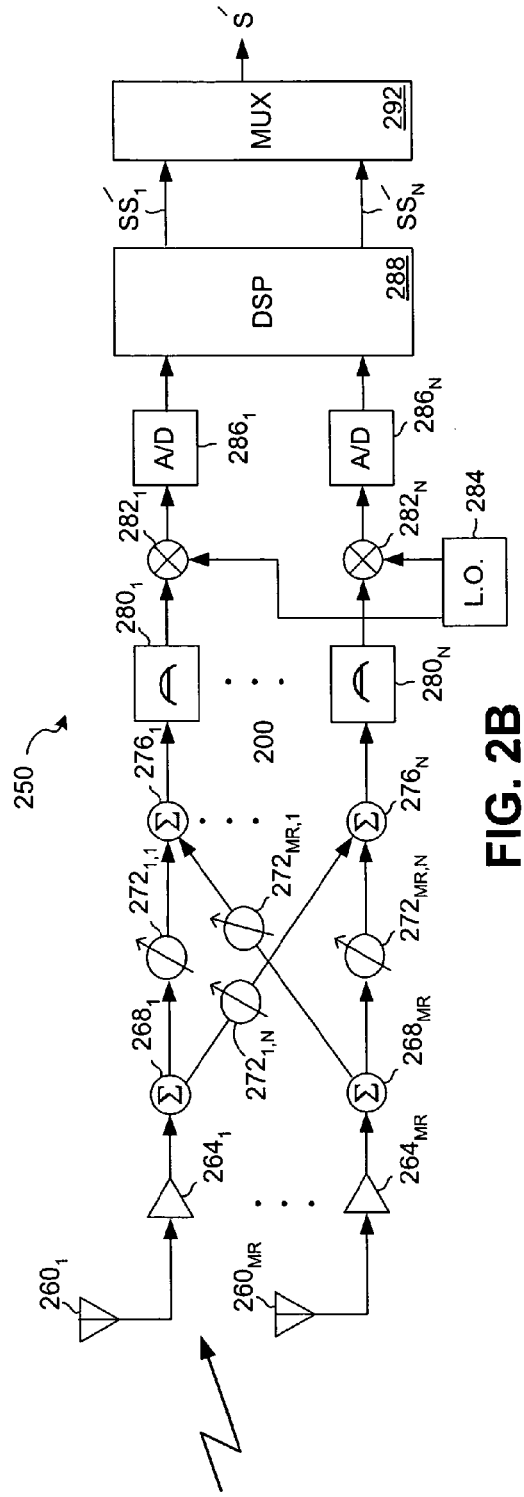

Referring to FIG. 2B, the MT RF signals transmitted by the transmitter 210 are received by the set of MR receive antennas 260 deployed at the receiver 250. Each of the MR received signals is amplified by a respective low noise amplifier 264 and then split N ways by one of a set of MR dividers 268. The resulting MR·(N) split signals are then each weighted by respective weighting circuits $272_{x,y}$, where x identifies a signal origination point at one of the MR dividers 268 and y identifies a corresponding signal termination point at one of a set of N combiners 276. These weighted signals are then combined using the N combiners 276 in order to form a set of N signals, which are passed through a corresponding set of N filters 280. The resulting N filtered signals are then downconverted to baseband using a set of N mixers 282, each of which is provided with a carrier signal produced by a local oscillator 284. Although the receiver 250 is realized as a homodyne receiver in the embodiment of FIG. 2B, it could also be implemented as a heterodyne receiver characterized by an intermediate IF frequency. The N baseband signals produced by the mixers 282 are then converted to digital signals via a corresponding set of N A/D converters 286. The N digital signals are then further processed using digital signal processor 288 to form the N spatially-multiplexed output signals $SS'_{1, 2 \ldots, N}$, which are the estimates of the N independent substreams $SS_{1, 2 \ldots, N}$. The N output signals $SS'_{1, 2 \ldots, N}$ are then multiplexed via a multiplexer 292 in order to generate the output signal S', which is an estimate of the input signal S.

It is observed that the transmitter 210 and receiver 250 are capable of implementing, within the RF domain, the same spatial weighting or linear combining schemes as are conventionally implemented at baseband via the system 100 of FIG. 1. However, the DSP 288 within the receiver 250 may still perform many other baseband signal processing operations potentially effected within the system 100, such as, for example, successive interference cancellation (see, e.g., "V-BLAST: An architecture for realizing very high data rates over the rich-scattering wireless channel", *Proceedings of URSI ISSSE*, September 1998, pp. 295-300). Again, it is a feature of the disclosed system that only N transmit/receive RF chains need be employed, even when substantially more than N transmit/receive antennas are deployed.

Coding and Equalization

Figure 3:
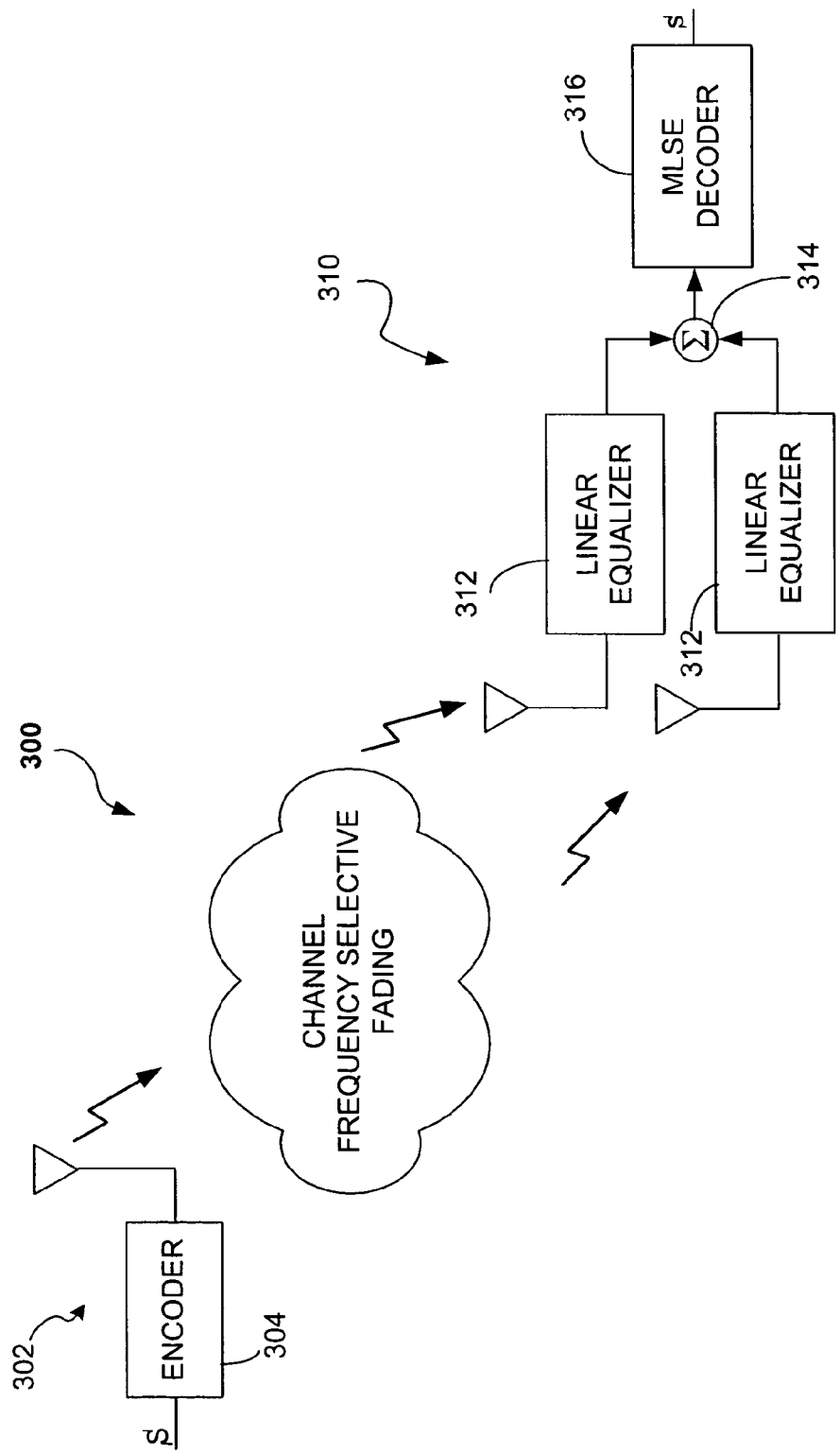
FIG. 3 depicts the transmitter and receiver structure in a single-channel (SC) single-input-multiple-output (SIMO) single carrier system with a baseband combining arrangement.

Referring to FIG. 3, shown is a block diagram of a single carrier system 300 using a transmitter 302 with one transmit antenna and a receiver 310 with two receive antennas and a maximum likelihood sequence estimation (MLSE) equalizer and decoder 316. The signal S could be, e.g., a GSM signal. The channel represents an environment that produces frequency selective fading, e.g., a multipath environment typical of indoor and outdoor propagation paths.

As shown in FIG. 3, when the signal S is transmitted over the channel, the signal S is subject to frequency selective fading that potentially degrades the signal S. To help offset the effects of frequency-selective fading, the receiver ideally is a spatial-temporal whitened matched filter, which is matched to the fading. As shown in FIG. 3 this filter consists of a linear equalizer 312 with a length corresponding to the channel (plus transmit filter) memory on each antenna followed by combining 314, with the combined signal fed into the MLSE equalizer and decoder 316.

The encoder 304 generally represents various coding schemes, e.g., convolutional codes, linear block codes, turbo codes or trellis codes, which may be used to enhance system performance. The following references, incorporated herein by reference, provide further detail, in the context of Enhanced Data for Global Evolution (EDGE) systems, of how for example, varying the coding rate of a convolutional code can enhance system performance: "System Performance of EDGE, a Proposal for Enhanced Data Rates in Existing Digital Cellular Systems", by A. Furuskar, et al, 48th IEEE Vehicular Technology Conference, Volume: 2, May 1998, pages 1284-1289 and "Radio Interface Performance of EDGE, a Proposal for Enhanced Data Rates in Existing Digital Cellular Systems", by A. Furuskar, et al, 48th IEEE Vehicular Technology Conference, Volume: 2, May 1998, pages 1064-1068.

Waterfilling

In all the above antenna systems, a received signal still suffers from distortion due to frequency selective fading. With respect to systems employing coding schemes, e.g., the system 300 described with reference to FIG. 3, it is known that with such distortion the capacity of the system can be maximized by waterfilling, see e.g., "Multiuser spatio-temporal coding for wireless communications", Wang, J.; Yao, K., Wireless Communications and Networking Conference, 2002, 17-21 Mar. 2002, pages: 276-279 vol. 1, whereby the transmit power at each frequency is proportional to the channel gain at that frequency, but no power is transmitted at a given frequency if the channel gain is below a given threshold. However, capacity is an idealized quantity that is a bound that may not be achievable because it requires perfect coding and/or equalization. In practice, the equalizer is not ideal and limited coding (or even no coding) is used.

Smoothing

On the other hand, without coding and equalization at the receiver, e.g., if the linear equalizer is replaced by a single complex weight and an MLSE is not used, a frequency selective transmit signal weighting technique referred to herein as "smoothing" may be employed to remove intersymbol interference at the receiver. With the smoothing technique, the transmit signal at each frequency is weighted with the inverse of the channel response at that frequency, i.e., pre-equalization that compensates for the frequency-selective channel is carried out. This technique is similar to Tomlinson precoding, see, e.g., "New Automatic Equaliser Employing Modulo Arithmetic", M. Tomlinson, Electronics Letters, Mar. 25, 1971, vol. 7, Nos. 5/6) incorporated herein by reference. It should be noted that this is the opposite of waterfilling as described above.

It should also be noted that with perfect interleaving/deinterleaving and coding, the system performance is based on the average receive signal-to-noise ratio (SNR). Smoothing, however, reduces this average SNR. As a consequence, smoothing is generally not desired when a system is utilizing coding. This is in contrast to waterfilling, which, under these circumstances, increases the SNR.

Since many systems today use a mixture of coding and equalization, and can operate with a variety of predetermined modes that have different coding and modulation techniques, with the modes changing, neither of these frequency selective transmit signal weighting methods is optimal and a different method for weight generation is needed.

The net effect is that the transmit filtering (frequency-selective signal weighting) that optimizes the performance depends not only on the equalizer used, but also on the coding and modulation technique. Since many systems, such as Enhanced Data for Global Evolution (EDGE) systems, operate using multiple modes, with different coding and modulation rates for each mode, the method for frequency selective transmit signal weighting according to several embodiments of the present invention, is based not only on the channel state information, but also on the mode. These weights can be generated to optimize a performance measure, such as output SNR, output bit error rate, or packet error rate.

II. Frequency Selective Transmit Signal Weighting Method

In an exemplary embodiment, the present invention relates to a frequency selective transmit signal weight-value generation method for transmit signal weighting in a multi-antenna communication system predicated upon improving system performance.

The teachings of the present invention are applicable to, for example, (i) receivers using multiple antennas in what are referred to herein as single channel systems (i.e., systems lacking spatial multiplexing), (ii) transmitters using multiple antennas in single channel systems, and (iii) systems in which a smaller number of RF chains are used at the transmitter and/or receiver than the number of transmit/receiver antennas in a MIMO system with spatial multiplexing or single-channel.

Although the present invention may be utilized in the development of RF-based spatial weighting and combining schemes implemented using low-cost RF components, the teachings of the present invention are equally applicable to implementations containing both RF-based and baseband spatial weighting and combining arrangements. Accordingly, the present invention is explained hereinafter both in the context of RF-based and baseband spatial weighting and combining schemes, which may both be simultaneously incorporated in various embodiments of the invention.

In another aspect, the present invention may be used for frequency selective transmit signal weight generation in a multiple-input-multiple-output communication system using a transmitter broadcasting a plurality (N) of spatially-multiplexed signals (using at least N transmit antennas), where the number of received antennas (M) is greater than the number of spatially-multiplexed signals. The received signals are split, weighted and combined at RF using frequency-independent weights to form a number of output signals equal to the number of spatially-multiplexed signals. The output signals are then fed to corresponding RF chains for processing at baseband.

Exemplary Scenarios

The frequency selective transmit-signal weighting and weight-value generation techniques of the present invention will be described hereinafter with reference to the exemplary scenarios illustratively represented by FIGS. 4-9. Although the inventive method is described herein with reference to exemplary system types, it should be recognized that the frequency selective transmit signal weighting method is not limited to the specific system types described with reference to FIGS. 4-9. For example, the inventive method described herein applies, without limitation to the following four scenarios: 1) a receiver using multiple antennas in a single channel SIMO system without spatial multiplexing, 2) a transmitter using multiple antennas in a single channel multiple-input single output (MISO) system without spatial multiplexing, 3) a transmitter using multiple antennas and a receiver using multiple antennas in a single channel MIMO system without spatial multiplexing, and 4) a system whereby a smaller number of RF chains are used at the transmitter and/or receiver than the number of transmitter/receiver antennas in a MIMO system with spatial multiplexing.

It should also be recognized that the frequency selective transmit signal weighting method described herein applies to the four above described system types when combined with baseband combining arrangements, RF-based weighting and combining arrangements, as well as with both RF-based and baseband arrangements.

For illustrative purposes, many of the following examples are described with reference to systems utilizing OFDM modulation; however, the frequency selective transmit signal weighting method described herein in some embodiments is applied to systems based upon a direct sequence spread spectrum (DS-SS). The above-referenced copending U.S. non-provisional application Ser. No. 10/801,930, describes in greater detail several such systems to which the present frequency selective transmit signal weighting method is applicable.

Figure 4:
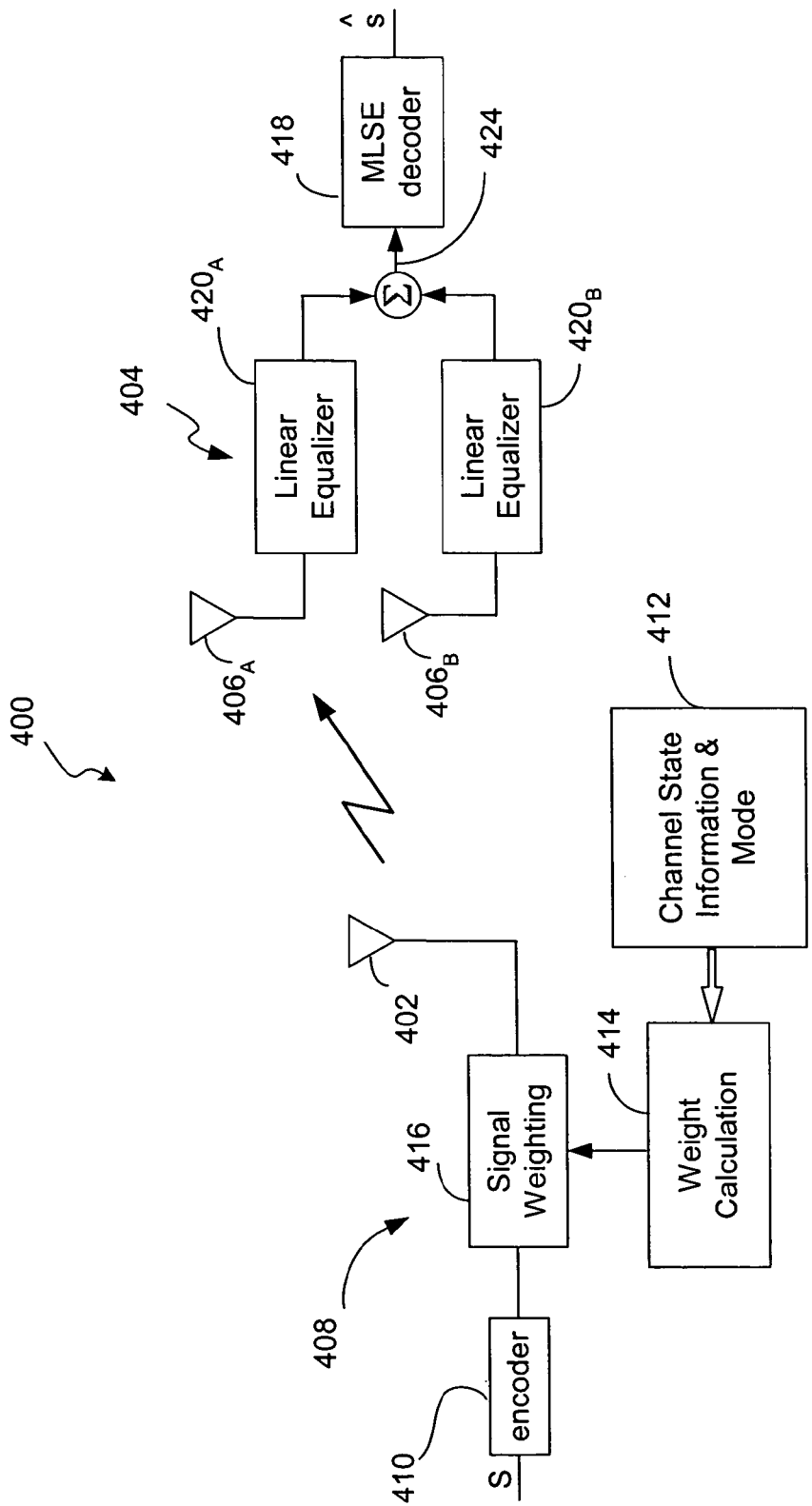
FIG. 4 depicts the transmitter and receiver structure in a SC-SIMO single carrier system utilizing an exemplary embodiment of the inventive transmit signal weight generation method together with a baseband combining arrangement.

Referring first to FIG. 4, shown is a block diagram of a single carrier system 400 using one transmit antenna 402 and a receiver 404 with two receive antennas $406_A$, $406_B$ in accordance with one embodiment of the present invention. As shown, the transmitter 408 in the present embodiment includes an encoder block 410, a channel state information (CSI) and mode portion 412, a weight calculation portion 414 and a signal weighting portion 416. The receiver in the present embodiment includes a maximum likelihood sequence estimation (MLSE) equalizer 418.

The signal S could be, e.g., a GSM signal, but this is certainly not required. With frequency-selective fading, the receiver 404 in some embodiments includes a spatial-temporal whitened matched filter, which is matched to the fading. As shown in FIG. 4 this filter includes a linear equalizer $420_A$, $420_B$ with a length corresponding to the channel (plus transmit and receive filters e.g., Root Raised Cosine filter) memory on each antenna followed by combining, with the combined signal 424 fed into the MLSE equalizer 418 and decoder. With such a receiver 404, assuming that total transmit power is fixed and perfect channel state information is available at the transmitter 408, the capacity of the system 400 is maximized by waterfilling, i.e., the transmit power at each frequency is proportional to the channel gain (or no power if the channel gain is below a threshold).

As previously discussed, however, capacity is based on ideal coding, and thus, the waterfilling solution only applies with ideal coding and equalization. In practice, the equalizer is not ideal, and limited coding (or even no coding) is often used.

Without coding and temporal equalization, i.e., if the linear equalizer $420_A$, $420_B$ is replaced by a single complex weight and an MLSE 418 is not used, then the performance is optimized by the smoothing approach discussed with reference to FIG. 3.

Further, it should be noted that with perfect interleaving/deinterleaving and coding, the system performance is based on the average receive signal-to-noise ratio (SNR). This average SNR is reduced by smoothing and increased by waterfilling.

Thus, as discussed further herein, the weight calculation portion 414 of the transmitter 408 determines transmit signal weighting (also referred to as transmit filtering) as a function of not only the equalizer used, but also of the coding and modulation technique. Beneficially, the weight calculation portion 414 produces weight values based on channel state information and mode, and it is adaptable to many systems, such as EDGE systems, that operate using multiple modes, with different coding and modulation rates for each mode. In several embodiments, these weights are generated to optimize a performance measure, such as output SNR or packet error rate.

Although FIG. 4 describes some embodiments of the present invention in the context of a single carrier system, such as GSM, the frequency selective transmit signal weighting according to several embodiments can also be applied to CDMA or WCDMA systems, where a RAKE receiver would be used. It can also be used with an OFDM system, and results for a two-transmit and two receive antenna single-channel MIMO system for the WLAN OFDM system 802.11a are described further herein.

In several embodiments, the frequency selective transmit signal weight values and transmit/receive spatial weight values are jointly calculated. Techniques to calculate the spatial weights under a variety of scenarios have been disclosed within the above-referenced co-pending U.S. non-provisional application Ser. No. 10/801,930 (now U.S. Pat. No. 7,539,274), with the spatial weight values calculated to improve (e.g., optimize), such performance measures as output SNR and packet error rate.

In several embodiments of the present invention, a global search technique is utilized to identify the frequency selective transmit signal weights that improve performance measures. This technique includes searching a table for combinations of frequency selective transmit signal weight values for a given transmission mode that improve performance measures including, for example, SNR and BER values. In some of these embodiments, both transmit signal weights and transmit/receive spatial weights are identified through this global search.

For example, a search engine looks for the combination of RF/baseband (i.e. spatial) weight values and transmit signal weights, which jointly improves (e.g., optimizes) a given criterion (e.g., max. SNR, min. BER) while fulfilling specific constraints (on the total transmit power, maximum allowable BER). The search engine may be blind or semi-blind (i.e., some known information may be modeled into closed-form functions and incorporated into the search to speed up running time). The search may be performed over both phases and amplitudes, as applicable, of each weight coefficient. For example, in one embodiment, the phases belong to a finite range between 0 and 360 degrees where the search step may be taken between 1 and 10 degrees. The amplitudes in some embodiments belong to a finite range of [0, 20 dB] where the search step may be taken between 0.1 to 1 dB.

Figure 5A:
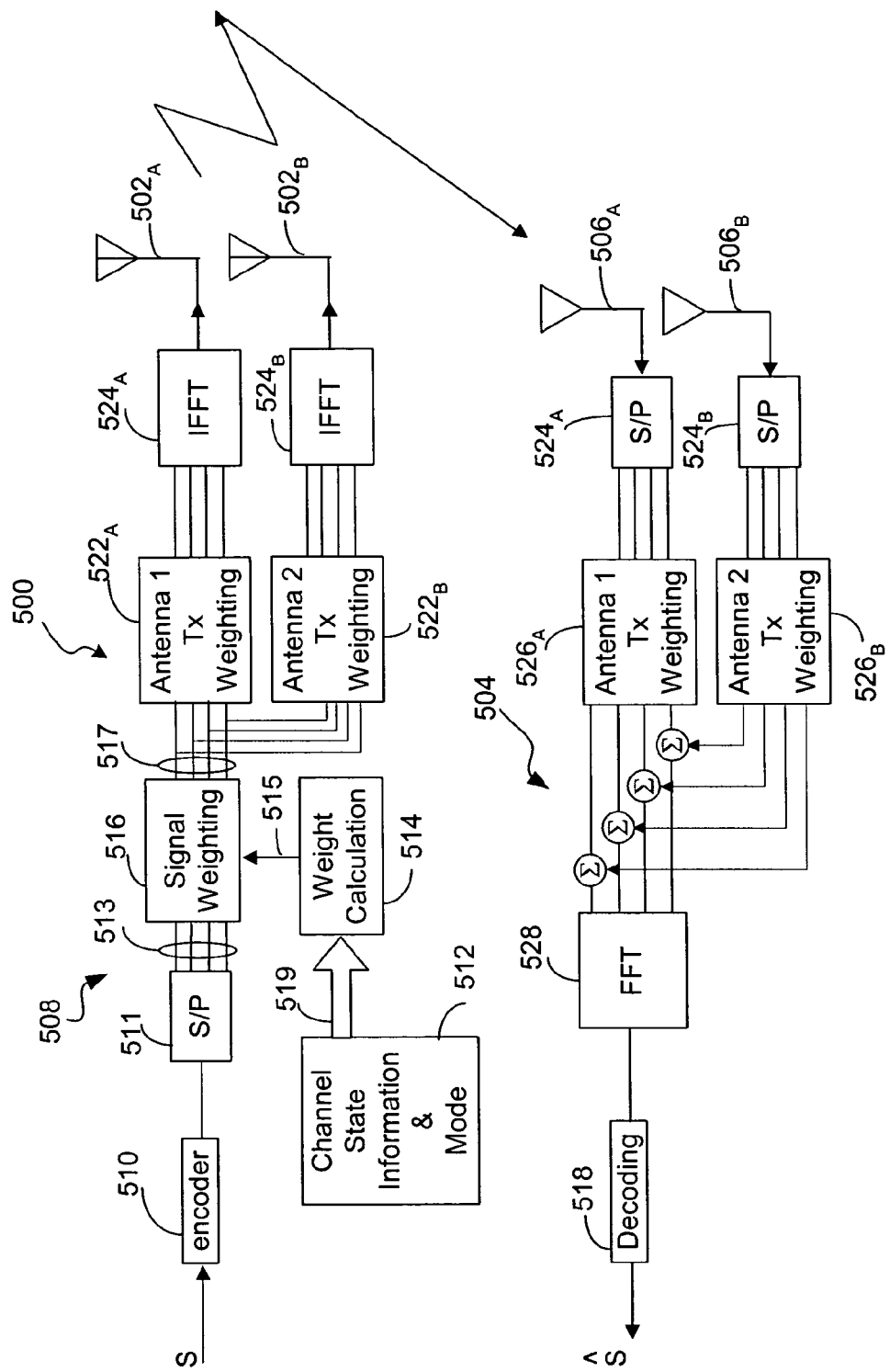
FIG. 5A depicts the transmitter and receiver structure of a SC-MIMO-OFDM system utilizing an embodiment of the inventive transmit signal weight generation method together with a baseband combining arrangement.
Figure 5B:
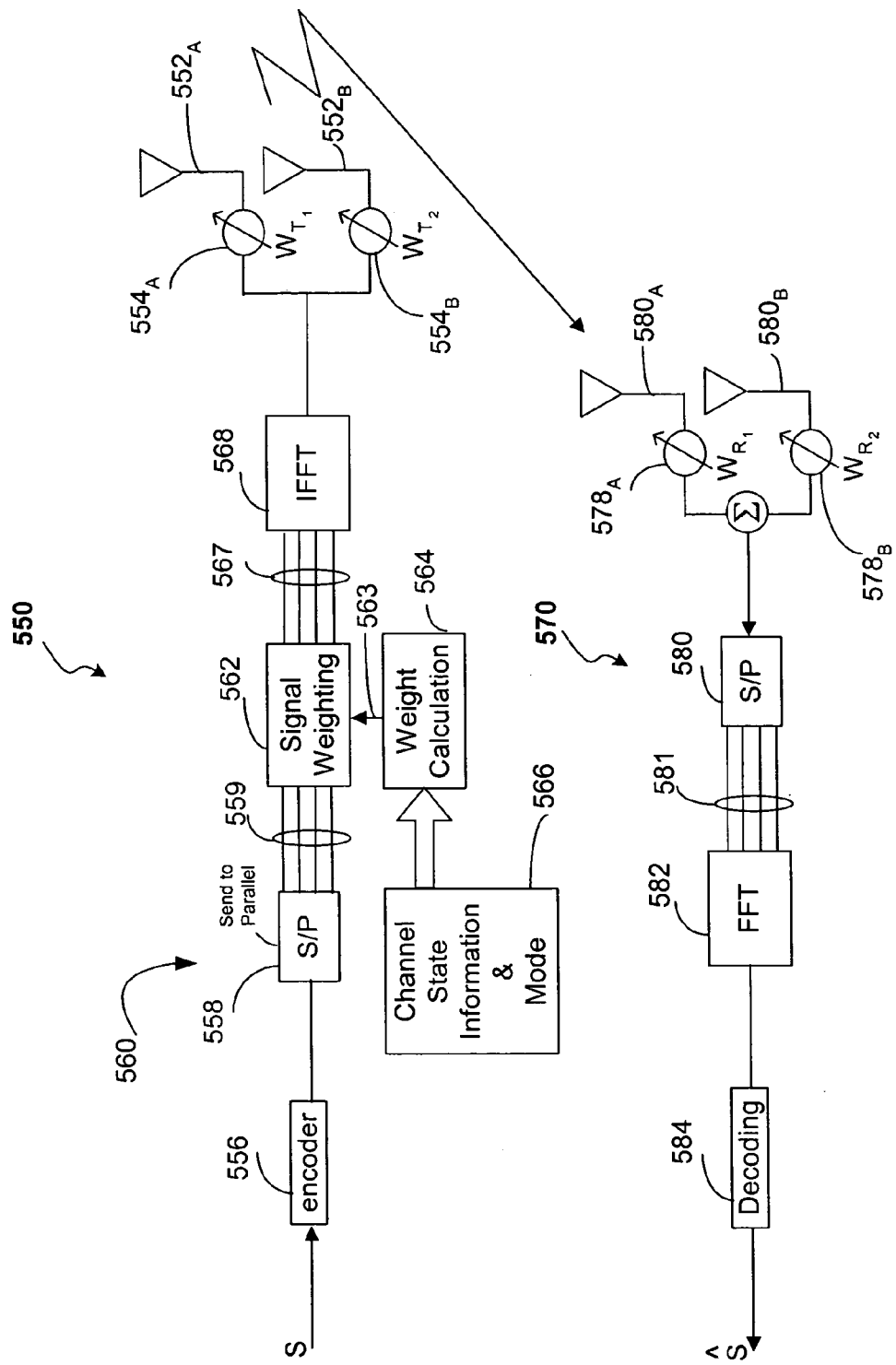
FIG. 5B depicts the transmitter and receiver structure of a SC-MIMO-OFDM system utilizing the inventive transmit signal weight generation method together with an RF-based weighting and combining arrangement.

Referring next to FIGS. 5A and 5B, shown are block diagrams of two exemplary transmitter/receiver systems 500, 550 that are capable of adhering to the requirements of the IEEE 802.11a standard. That is, the transmitters 508, 560 use OFDM modulation, where a stream of $N_t$ consecutive quadrature amplitude modulation (QAM)-modulated data symbols, denoted by $\{s_0, s_1, \ldots, s_{N_t-1}\}$ is modulated onto a set of $N_t$ orthogonal subcarriers, see, e.g., J. Heiskala and J. Terry, OFDM Wireless LANs: A Theoretical and Practical Guide, Sams Publishing, December 2001, which is incorporated herein in its entirety by reference.

Referring initially to FIG. 5A, shown is a block diagram of a single channel MIMO-OFDM system 500 using two-transmit antennas $502_A$, $502_B$ and two-receive antennas $506_A$, $506_B$, in accordance with one embodiment of the present invention. As shown, the transmitter 508 in the present embodiment includes an encoder block 510, a serial-to-parallel converter 511, a channel state information (CSI) and mode portion 512, a weight calculation portion 514 and a signal weighting portion 516. In the present embodiment, the signal S is encoded by the encoder block 510 and then separated by the serial-to-parallel converter 511 into parallel data substreams 513. The signal weighting portion 516 receives and weights the parallel data substreams 513 with transmit signal weight values 515 received from the weight calculation portion 514.

As shown, the weight calculation portion 514 receives information about the channel state and the current operating mode from the CSI and mode portion 512. Based upon the state of the channel and the transmission mode of the signal, the weight calculation portion 514 determines the transmit weighting values for the signal as a function of frequency.

In the exemplary embodiment, the weighted signal, comprising weighted parallel data substreams 517, is then transmitted through each of a plurality of antennas $502_A$, $502_B$ after being spatially weighted with one of a corresponding plurality of antenna spatial weighting modules $522_A$, $522_B$ and converted, using corresponding Inverse Fast Fourier Transforms $524_A$, $524_B$, into an OFDM signal for each of the plurality of antennas $502_A$, $502_B$. It is noted that the spatial weighting $522_A$, $522_B$ in this embodiment is implemented at base band, and as such, the antenna (spatial) weights are available for each OFDM tone at both the receiver and transmitter The signal transmitted by antennas $502_A$, $502_B$ then propagates through the channel and is received by antenna elements $506_A$, $506_B$ and then converted into baseband. After serial to parallel conversion $524_A$, $524_E$ the received baseband signals are multiplied by receive spatial weights $526_A$, $526_B$, at each tone. After weighting, the signals are provided to an FFT 528 and combined. The combined received signal at the output of the FFT 528 is then decoded 518 to generate a replica of the original signal.

Turning again to FIG. 5B, shown is a block diagram depicting a single channel MEMO-OFDM system 550 with two transmit $552_A$, $552_B$ and two receive $580_A$, $580_B$ antennas in accordance with another embodiment of the present invention. As shown, the system in FIG. 5B is a multiple weight system where one complex RF weight 554, 578 is available per antenna for all the tones at the transmitter 560 and receiver 570. In this case, the spatial weights are implemented at RF, but in alternate implementations, the RF-based weighting 554, 578 within the transmitter 560 and receiver 570 of FIG. 5B may be complemented by similar arrangements at baseband. The calculation of the spatial weights for both cases is described in the above-identified copending U.S. non-provisional application Ser. No. 10/801,930 for maximization of the output SNR, and in co-pending U.S. non-provisional Application entitled WEIGHT GENERATION METHOD FOR MULTI-ANTENNA COMMUNICATION SYSTEMS UTILIZING RF-BASED AND BASEBAND SIGNAL WEIGHTING AND COMBINING BASED UPON MINIMUM BIT ERROR RATE, filed Jul. 13, 2004, which itself claims priority to U.S. Provisional Application Ser. No. 60/488,845, filed Jul. 21, 2003, for minimization of the output bit error rate.

In operation, a signal S is first encoded 556 and then separated by the serial-to-parallel converter 558 into parallel data substreams 559. A signal weighting portion 562 receives and weights the parallel data substreams 559 with transmit signal weight values 563 received from a weight calculation portion 564.

As shown, the weight calculation portion 564 receives information about the channel state and the current operating mode from the CSI and mode portion 566. Based upon the state of the channel and the transmission mode of the signal, the weight calculation portion 564 determines the transmit weighting values for the signal as a function of frequency.

In the exemplary embodiment, the weighted signal, comprising weighted parallel data substreams 567, is then converted, using an Inverse Fast Fourier Transform 568 into an OFDM signal that is up-converted to RF domain, split and each version of the OFDM signal in the RF domain is spatially weighted $554_A$, $554_B$ and transmitted over a corresponding one of the transmit antennas $552_A$, $552_B$. It is observed that in the embodiment of FIG. 5B, the combining weights 554 are implemented in the RF domain rather than at baseband, which enables the number of transmit RF chains to be reduced to one.

The signal transmitted by antennas $552_A$, $552_B$ then propagates through the channel and is received by antenna elements $580_A$, $580_B$, and each RF signal received by the receive antennas is multiplied by corresponding receive spatial weights $578_A$, $578_B$ before being combined, converted into baseband, and converted from serial to parallel substreams 581, which are provided to an FFT 582 and combined. The combined received signal at the output of the FFT 582 is then decoded 584 to generate a replica of the original signal S.

Figure 6:
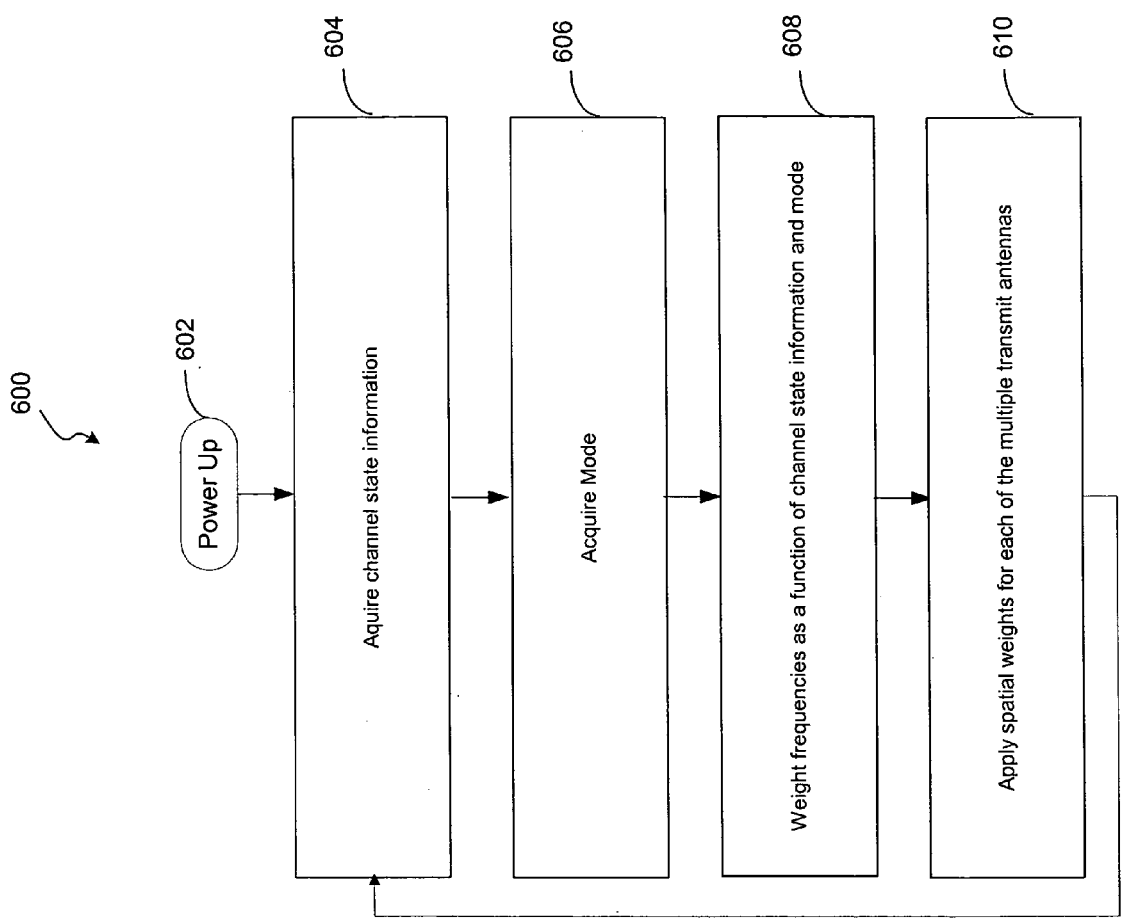
FIG. 6 is a flowchart depicting steps carried out in accordance with one embodiment of the inventive transmit signal weight generation method.

Referring next to FIG. 6, shown is a flowchart illustrating steps of the frequency signal weighting method carried out by the transmitters of FIGS. 4, 5A and 5B according to one embodiment of the present invention.

Initially, when the transmitter first powers up (Step 602), and the channel state is still unknown, a set of "default" frequency signal weight values are used by the signal weighting portion 416, 516, 562. Since these transmit signal weights can only improve performance, the default set of weights can be chosen, for example, as if transmit signal weighting was disabled, or equivalently, all weights are set to unity.

Next, channel state information-(CSI) is acquired (Step 604). In some embodiments, operations to acquire CSI are carried out at the receiver, and the relevant information is fed back over the air, via a control message, to the transmitter to the CSI and mode acquisition portion 412, 512, 566 of the transmitter. In these embodiments, a training sequence composed of known symbols is sent from the transmitter 408, 508, 560 to the receiver 404, 504, 570. At the receiver 404, 504, 570, the channel is estimated based on the received signal and the known sequence of symbols. There exists many channel estimation techniques based on training sequences, e.g., see J.-J. van de Beek et al., "On Channel Estimation in OFDM Systems," *IEEE 45th Vehicular Technology Conference*, vol. 2, 25-28 Jul. 1995, pp. 815-819, which is incorporated herein by reference.

Next, in some embodiments, once the channel is known, an algorithm is employed to decide which of the possible mode candidates is best suited to the current CSI (Step 606). The algorithm is usually referred to as link adaptation, which ensures that the most efficient mode is always used, over varying channel conditions, given a mode selection criterion (maximum data rate, minimum transmit power). Additional details on link adaptation for frequency-selective MIMO systems are in, "Adaptive Modulation and MIMO Coding for Broadband Wireless Data Networks," by S. Catreux et al., IEEE Communications Magazine, vol. 40, No. 6, June 2002, pp. 108-115. At this point, both channel state and mode information may be fed back to the transmitter 408, 508, 560, and the weight calculation portion 414, 514, 564 uses this information to compute the transmit signal weight values.

In variations of these embodiments, transmit signal weight values are alternatively calculated at the receiver and the resulting weights are fed back to the transmitter via a control message over the air. Note that this feedback assumes that the channel varies slowly enough that there is sufficient correlation between the CSI used to compute the weights at the receiver and the CSI the weights are applied to at the transmitter.

In other embodiments, all operations to establish CSI and mode acquisition are carried out at the transmitter 408, 508, 560. In certain systems (e.g., Time Division Duplex (TDD)

systems in noise-limited environment) the uplink channel is the same as the downlink channel. Therefore, the transmitter may estimate the channel, compute the mode and transmit signal weight values and use those estimated parameters for transmission over the downlink channel. In these other embodiments, the transmitter receives a training sequence from the uplink channel, carries out channel and mode estimation and finally computes the transmit signal weight values. This avoids the need for feedback.

After the channel state becomes available, the default weights are replaced by more optimal frequency weights that are computed (e.g., by the weight calculation portion 414, 514, 564) based on the current CSI and current mode (Step 608).

In the multiple carrier (OFDM) embodiments described with reference to FIGS. 5A and 5B, each tone is scaled by a transmit signal weight based on the current CSI and current mode. The scaled data symbol at tone k is denoted by:

$$a_k s_k \quad (1.)$$

In some embodiments, once each tone is scaled by a transmit signal weight, then spatial weights are applied (Step 610). In the context of OFDM systems, the scaled data symbols $a_k s_k$ are multiplied by the transmit spatial weights for each of the multiple transmit antennas, and the transmitted signal out of antenna i is written as:

$$txs_{i,k} = v_{i,k} \alpha_k s_k \quad (2.)$$

The transmit signal vector at tone k is $$\underline{txs}_k = \underline{v}_k \cdot \alpha_k s_k \quad (3.)$$

where $\underline{v}_k = [v_{1,k}, \ldots, v_{n_T,k}]^T$ is a $n_T \times 1$ vector with $n_T$ as the number of transmit antenna elements.

The signal transmitted by antenna i then propagates through the channel and is received by an array of M antenna elements where it is multiplied by the receive spatial weights, denoted by $\underline{u}_k = [u_{1,k}, \ldots, u_{M,k}]^T$ at each tone. After weighting, the signal is provided to the FFT and combined. The combined received signal at the output of the FFT is written as:

$$y_k = \underline{u}_k^H H_k \cdot \underline{v}_k \cdot \alpha_k s_k + \underline{u}_k^H \underline{n}_k \quad (4.)$$

where $H_k$ is the channel frequency response at tone k, a matrix of size $M \times n_T$ and n is complex-valued additive white gaussian noise (AWGN) with zero-mean and variance $\sigma^2$.

As described earlier, in certain embodiments coding and temporal equalization are not utilized, and smoothing is used to improve the receiver performance. In OFDM-based systems, such as those described with reference to FIGS. 5A and 5B, the process of applying smoothing includes scaling the tones with transmit signal weights such that the post-processing SNR (also referred to herein as the output SNR), at the receiver is flat across the frequency bandwidth (BW). The post-processing SNR corresponding to (4) is:

$$SNR_k = \frac{\|\underline{u}_k^H H_k \cdot \underline{v}_k\|^2 |\alpha_k|^2 E[s_k s_k^*]}{\sigma^2 \|\underline{u}_k\|^2} \quad (5.)$$

When smoothing is introduced, the value of $\alpha_k$ is such that $SNR_k$ is the same at each tone. According to (5), the solution for $\alpha_k$ is:

$$\alpha_k = \frac{\|\underline{u}_k\|}{\|\underline{u}_k^H H_k \cdot \underline{v}_k\|} \quad (6.)$$

If the receive spatial weights are unit-norm at each tone, the solution for $\alpha_k$ becomes:

$$\alpha_k = \frac{1}{\|\underline{u}_k^H H_k \cdot \underline{v}_k\|} \quad (7.)$$

In order to keep the total transmit power across the tones, (i.e., $N_t \cdot P$), constant regardless of the number of transmit antenna elements or whether transmit frequency signal weighting is used or not, we assume that each of the digital symbols has a power $P/n_T$, i.e., $$E[s_k s_k^*] = P/n_T \quad (8.)$$

The total transmit power across the tones based on (3) and (8) is $$TXPW = \sum_{k=1}^{N_t} E[\alpha_k^* s_k^* \underline{v}_k^H \underline{v}_k \alpha_k s_k] = \quad (9.)$$

$$\sum_{k=1}^{N_t} \underline{v}_k^H \underline{v}_k |\alpha_k|^2 E[s_k s_k^*] = P/n_T \sum_{k=1}^{N_t} \underline{v}_k^H \underline{v}_k |\alpha_k|^2 = N_t P$$

then the constraint on the frequency-scaled transmit weights is expressed as $$\sum_{k=1}^{N_t} \underline{v}_k^H \underline{v}_k |\alpha_k|^2 = N_t n_T \quad (10.)$$

Transmit smoothing as illustrated above unevenly redistributes the total transmit power across the bandwidth, by improving the SNR of the worst tones, while decreasing the SNR of the better tones. In the event that the channel goes through a deep fade in a particular tone, most of the power will be redirected towards that particular tone, which would not be optimal.

Thus, in one embodiment, a criterion is added to the smoothing algorithm described above to limit the maximum peak transmit power applicable to one tone. In other words, the value of $\alpha_k$ is upper-bounded by a threshold. In this way, when a particular tone undergoes deep fading, that particular tone does not detrimentally draw a disproportionate amount of available power.

When coding is used, the transmit smoothing method described above degrades the receiver performance because of the reduced average output SNR (as shown in the simulation results below); thus in several embodiments, when coding is used, a transmit signal weighting technique other than the smoothing technique described above is utilized.

In several embodiments for example, a weighting technique referred to herein as Quantized Partial Signal Weighting (QPSW) is utilized when the system uses coding. With this QPSW weighting technique, the power of a percentage of tones (those corresponding to an Xth percentile of the largest output SNR at each tone) is scaled down by an amount of A dB (where A can be a constant or a function of the output SNR) while scaling up the transmit power of another percentage of tones (those corresponding the Yth percentile of smallest output SNR at each tone) by an amount of B dB (where B is a constant or a function of the output SNR). In these embodiments, the values of X, Y, A and B are dependent upon the coding technique used. Given a code, these values may be found with a global search.

Figure 7:
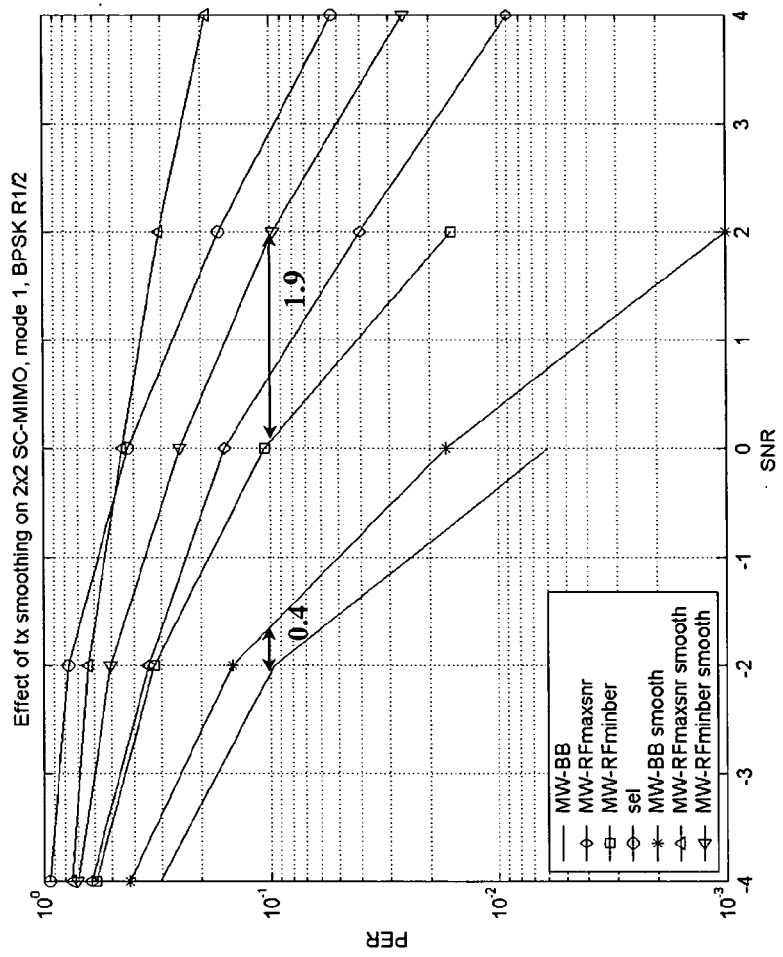
FIG. 7 illustratively represents comparative performance packet error rate (PER), as a function of signal-to-noise ratio (SNR) for a coded operative mode of a SC-MIMO-OFDM system.
Figure 8:
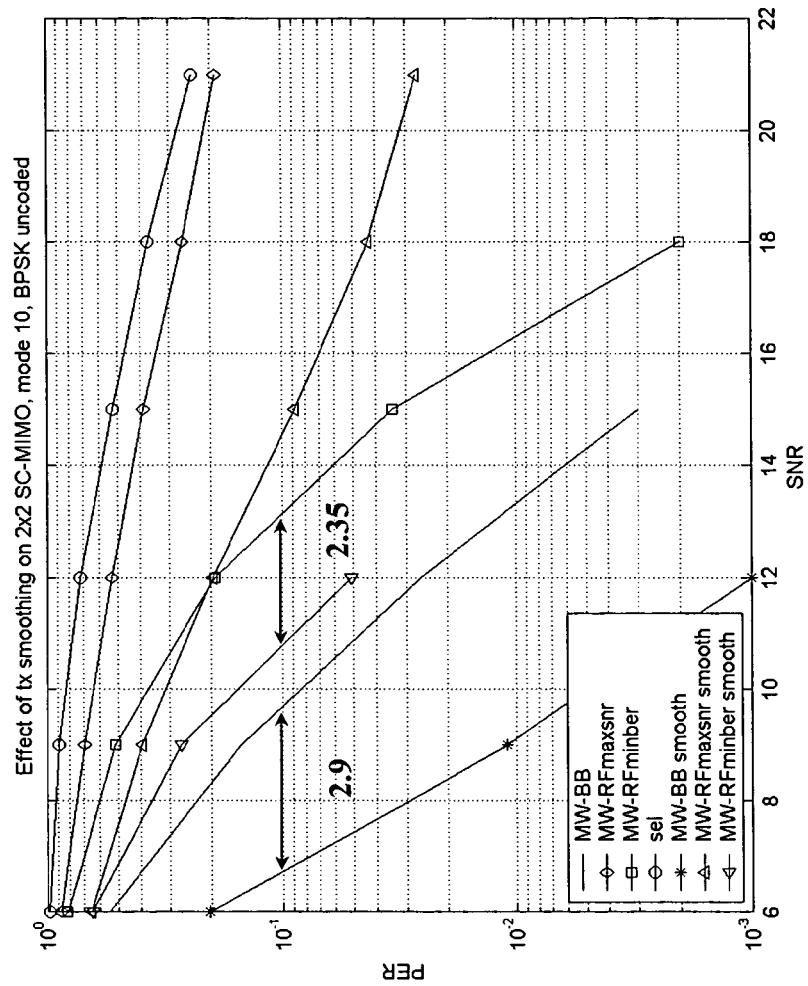
FIG. 8 illustratively represents comparative performance PER, as a function of SNR for an uncoded operative mode of a SC-MIMO-OFDM system.

FIGS. 7 and 8 show the effect of smoothing on the systems of FIGS. 5A and 5B. In particular, FIG. 7 shows the packet error rate versus receive SNR for a signal formatted consistently with 802.11a "mode 1" (i.e. BPSK with coding rate ½), and FIG. 8 shows the packet error rate versus receive SNR for 802.11a "mode 10" (BPSK uncoded) signals.

Curves shown for the system described with reference to FIG. 5A are labeled MW-BB (for multiple weights at baseband) and curves for the system described with reference to FIG. 5B are labeled MW-RF (for multiple weights at RF). Results for FIG. 5B are shown for both the maximum SNR criterion as well as the minimum bit error rate criterion. Selection diversity results are also shown (labeled sel).

As shown in FIG. 7, for mode 1, smoothing degrades the performance because mode 1 is operative using rate ½ coding. As shown, at a 10**−1 packet error rate, this degradation is 0.4 dB for the system described with reference to FIG. 5A and 1.9 dB for the system described with reference to FIG. 5B.

In contrast, as shown in FIG. 8, for mode 10 smoothing improves performance because this mode is uncoded. As shown, for a 10**−1 packet error rate, smoothing improves performance by 2.9 and 2.35 dB for the systems described with reference to FIGS. 5A and 5B, respectively. Thus, these results validate the frequency weighting algorithm of several embodiments, which establishes transmit signal frequency-selective weights as a function of the mode a particular communication system is operating under.

Figure 9:
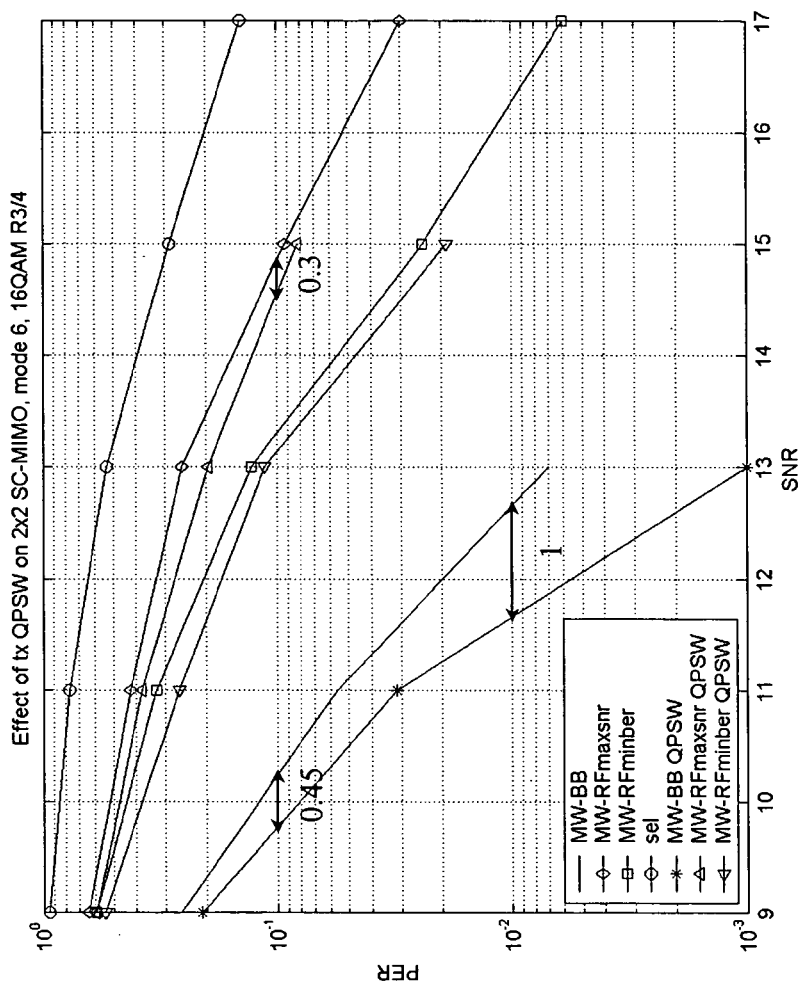
FIG. 9 illustratively represents comparative performance PER, as a function of SNR for a coded 16QAM-modulated operative mode of a SC-MIMO-OFDM system.

FIG. 9 shows the packet error rate versus receive SNR as a result of the QPSW technique on the systems described with reference to FIGS. 5A and 5B operating according to mode 6 (16QAM with coding rate ¾).

For mode 6, the QPSW technique described above was implemented with X=30, A=1.5 dB, Y=X and B as a function of the output SNR. As shown in FIG. 9, for a 10−1 packet error rate, this transmit signal weighting approach improves performance by 0.45 and 0.3 dB for FIGS. 5A and 5B, respectively. At the level of PER at 10−2, the improvement from QPSW on the system of FIG. 5A is 1 dB.

In several embodiments, these weights track the variations of the CSI. For example, as soon as the CSI changes, the weights are updated as well. For example, in packet-based systems, a training sequence is embedded at the beginning of each packet; thus the CSI is available at each packet. In video streaming applications, packets are sent continuously, and since the channel is not expected to change significantly from packet to packet, the CSI variations can be accurately monitored and the transmit signal weights are updated adequately. In some of these embodiments, efficiency may be improved by only updating the weights if the CSI has varied by more than a pre-selected threshold.

In more bursty applications (e.g., Internet downloading), there may be down periods during which no packets are transmitted. Thus, in some embodiments, if the down time is longer than the channel coherence time, the weights are re-initiated to their default values and the processed described above is started again.

Those skilled in the art will readily appreciate that the present invention extends to single carrier systems as well. Similar to OFDM embodiments, in the single carrier embodiments, the transmit signal weighting that optimizes performance will depend on the modulation, coding, and equalization technique used. As discussed above, waterfilling is optimal when ideal coding and equalization are used, but smoothing is optimal if no equalization or coding are used at the receiver. Since most systems fall in between these two cases with some coding and nonideal equalization, the optimal transmit signal weighting will vary, and can be found, e.g., by a global search. Since the modulation and coding can vary in some systems, then the optimal transmit signal weighting will also vary with the modulation and coding (mode) accordingly.

While the present invention has been described in detail and graphically in the accompanying drawings, it is not limited to such details since many changes and modifications recognizable to those of ordinary skill in the art may be made to the invention without departing from the spirit and the scope thereof. This includes the use of this invention in mobile, fixed, narrowband/broadband, and outdoor/indoor wireless systems, as well as time division duplex and frequency division duplex wireless systems.

Furthermore, the foregoing description used specific nomenclature, for purposes of explanation, to provide a thorough understanding of the invention. However, it is readily apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

We claim:

1. A method for communication in a user equipment, comprising:
   determining, by said user equipment, transmit power weights, which are to be utilized for communicating one or more wireless signals via a wireless channel, as a function of frequency of a wireless signal communicated via said wireless channel, based on a transmission mode of said wireless signal and a state of said wireless channel;
   determining, by said user equipment, transmit antenna spatial weights for communicating said one or more wireless signals via a plurality of antennas;
   weighting, by said user equipment, said one or more wireless signals with a joint optimization of said transmit power weights and one of said transmit antenna spatial weights; and
   transmitting, by said user equipment, via one of said plurality of antennas said weighted one or more wireless signals in accordance with said transmission mode.

2. The method according to claim 1, further comprising acquiring information indicative of said state of said wireless channel when said wireless signal is transmitted over said wireless channel.

3. The method according to claim 1, further comprising acquiring information indicative of said transmission mode of said wireless signal when said wireless signal is transmitted over said wireless channel.

4. The method according to claim 1, wherein said determined transmit power weights of any frequency of said weighted one or more signals are upper-bounded by a threshold.

5. The method according to claim 1, wherein said joint optimization takes place using a global search.

6. The method according to claim 1, wherein said weighting of said one or more signals takes place during one or both of baseband signal processing and/or RF signal processing.

7. The method according to claim 1, further comprising determining said transmit power weights based at least in part on reducing power of at least a portion of frequencies of said one or more wireless signals that correspond to frequencies of said wireless signal with a signal-to-noise ratio (SNR) above a threshold.

8. The method according to claim 1, further comprising determining said transmit power weights based at least in part on increasing power of at least a portion of frequencies of said one or more wireless signals that correspond to frequencies of said wireless signal with a signal-to-noise ratio (SNR) below a threshold.

9. The method according to claim 1, wherein said one or more wireless signals comprise at least one of a single carrier signal, a GSM signal, a multi-carrier signal, a code division multiple access (CDMA) signal, an ultra-wideband signal, and/or an orthogonal frequency division multiplexed (OFDM) signal.

10. The method according to claim 1, wherein said transmit power weights comprise at least one scalar value.

11. The method according to claim 1, further comprising jointly optimizing at least one performance measure based on said weighting of said one or more wireless signals.

12. The method according to claim 11, wherein said performance measure comprises one or both of an output signal-to-noise ratio (SNR) and/or an output packet error rate (PER).

13. A user equipment for communication, comprising:
one or more processors and/or circuits configured to:
determine transmit power weights, which are to be utilized for communicating one or more wireless signals via a wireless channel, as a function of frequency of a wireless signal communicated via said wireless channel, based on a transmission mode of said wireless signal and a state of said wireless channel;
determine transmit antenna spatial weights for communicating said one or more wireless signals via a plurality of antennas;
weight said one or more wireless signals with a joint optimization of said transmit power weights and one of said transmit antenna spatial weights; and
transmit via one of said plurality of antennas said weighted one or more wireless signals in accordance with said transmission mode.

14. The user equipment according to claim 13, wherein said one or more processors and/or circuits are further configured to acquire information indicative of said state of said wireless communication channel when said wireless signal is transmitted over said wireless channel.

15. The user equipment according to claim 13, wherein said one or more processors and/or circuits are further configured to acquire information indicative of said transmission mode of said wireless signal when said wireless signal is transmitted over said wireless channel.

16. The user equipment according to claim 13, wherein said determined transmit power weights of any frequency of said weighted one or more signals are upper-bounded by a threshold.

17. The user equipment according to claim 13, wherein said joint optimization takes place using a global search.

18. The user equipment according to claim 13, wherein said weighting of said one or more signals takes place during one or both of baseband signal processing and/or RF signal processing.

19. The user equipment according to claim 13, wherein said one or more processors and/or circuits are further configured to determine said transmit power weights based at least in part on reducing power of at least a portion of frequencies of said one or more wireless signals that correspond to frequencies of said wireless signal with a signal-to-noise ratio (SNR) above a threshold.

20. The user equipment according to claim 13, wherein said one or more processors and/or circuits are further configured to determine said transmit power weights based at least in part on increasing power of at least a portion of frequencies of said one or more wireless signals that correspond to frequencies of said wireless signal with a signal-to-noise ratio (SNR) below a threshold.

21. The user equipment according to claim 13, wherein said one or more wireless signals comprise at least one of a single carrier signal, a GSM signal, a multi-carrier signal, a code division multiple access (CDMA) signal, an ultra wideband signal, and/or an orthogonal frequency division multiplexed (OFDM) signal.

22. The user equipment according to claim 13, wherein said transmit power weights comprise at least one scalar value.

23. The user equipment according to claim 13, wherein said one or more processors and/or circuits are further configured to jointly optimize at least one performance measure based on said weighting of said one or more wireless signals.

24. The user equipment according to claim 23, wherein said performance measure comprises one or both of an output signal-to-noise ratio (SNR) and/or an output packet error rate (PER).

* * * * *